No. 768,571. PATENTED AUG
A. J. MUNDY.
SOUND TRANSMITTER AND RECEIVER.
APPLICATION FILED APR. 23, 1902.
NO MODEL. 2 SHE

WITNESSES: INVEN

No. 768,571. Patented August 23, 1904.

UNITED STATES PATENT OFFICE.

ARTHUR J. MUNDY, OF BOSTON, MASSACHUSETTS, ASSIGNOR TO SUBMARINE SIGNAL COMPANY, OF WATERVILLE, MAINE, A CORPORATION OF MAINE.

SOUND TRANSMITTER AND RECEIVER.

SPECIFICATION forming part of Letters Patent No. 768,571, dated August 23, 1904.

Application filed April 23, 1902. Serial No. 104,301. (No model.)

*To all whom it may concern:*

Be it known that I, ARTHUR J. MUNDY, a citizen of the United States, and a resident of Boston, in the county of Suffolk and State of Massachusetts, have invented a new and useful Improvement in Sound Transmitters and Receivers, of which the following is a full, clear, and exact description, reference being had to the accompanying drawings, forming a part of this specification, in explaining its nature.

The invention relates to a sound transmitter and receiver adapted to receive sound-vibrations imparted to water by a submerged sound-signaling apparatus and transferred by the water from the signaling apparatus to the transmitter and wherever said transmitter may be used in the water.

It consists in the employment of an electrical sound-transmitter preferably in conjunction with a resonating tube within which the transmitter is contained and the position of which may be varied or adjusted therein.

I have discovered that a transmitter and a resonating tube thus associated produce a magnifying effect upon the transmission of the sound-vibrations, the value of which is indicated by the increased power with which they are delivered by the receiver.

Figure 1:
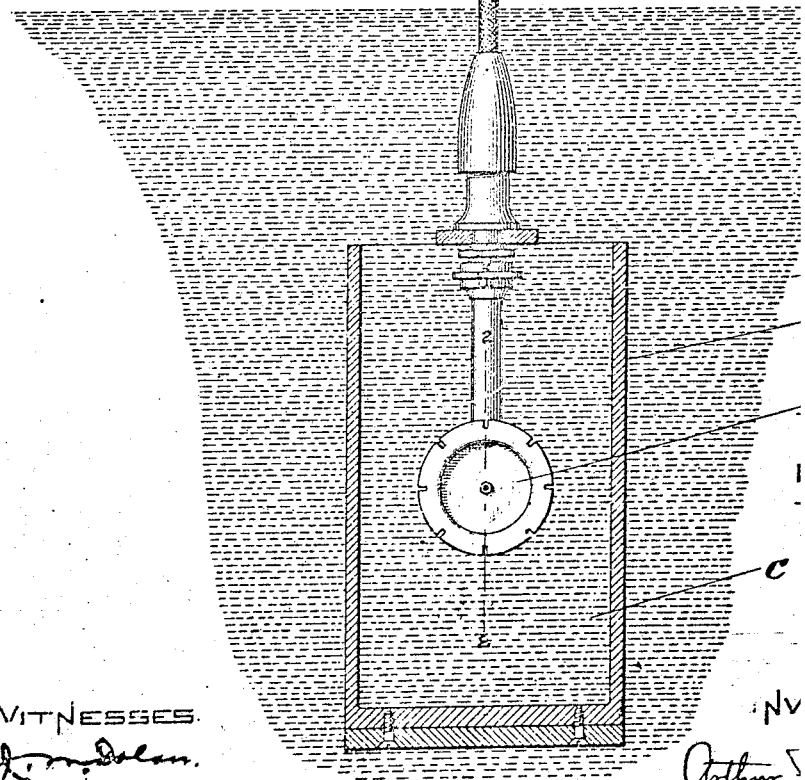
Figure 2:
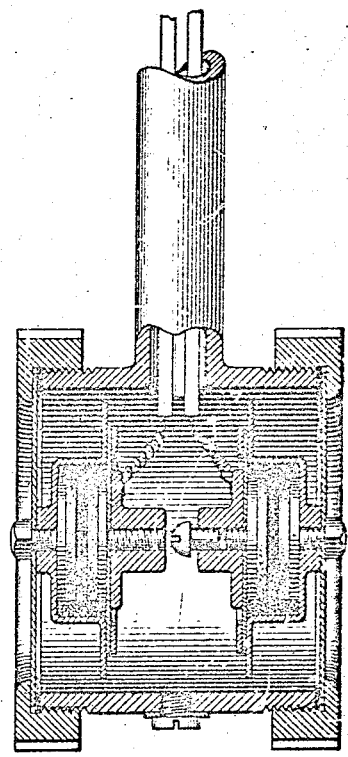

Referring to the drawings, Figure 1 is a view in elevation of the assembled receiving apparatus. Fig. 2 is a detail view in cross-section of the transmitter.

Referring to the drawings, A represents the resonating tube; B, the water in which it is submerged; C, the water which is contained therein; D, the electrical transmitter submerged in the water in the tube, and E the receiver, which is shown in duplex form and which is in electrical connection with the transmitter. The position of the transmitter within the tube may be varied lengthwise it, and the tube may be wholly filled with water, as represented in the figures, or partially filled with it. It is preferable that the transmitter should be axially located in the tube, as I have ascertained that the resonating tube also acts to focus the sound, but not necessarily uniformly. The sound-vibrations imparted to the water by the submerged signaling apparatus are by it transferred, and the resonating tube receives such vibrations, amplifies them, transmits them to the water contained in the tube, which in turn delivers the vibrations to the electrical transmitter.

While I have described the resonating tube as containing water and while I prefer to employ water, yet I do not confine myself to the use of water, as any other suitable incompressible fluid may be used.

Having thus fully described my invention, I claim and desire to secure by Letters Patent of the United States—

1. A sound transmitter and receiver, the same comprising a resonating tube, an electric transmitter contained therein, and a sound-receiver in circuit with the transmitter.

2. A sound transmitter and receiver comprising a resonating tube, an electric transmitter adjusted in said tube to the center thereof, and a sound-receiver electrically connected with the transmitter.

3. A sound transmitter and receiver, the same comprising a resonating tube filled with a vibratory fluid medium, an electric transmitter submerged within the tube in said medium, and a sound-receiver electrically connected with the transmitter.

4. A resonating tube submerged in water and adapted to receive sound-vibrations imparted to the water and transferred by it, the said tube also being filled with water, an electric transmitter contained in said tube, and a receiver electrically connected with the sound-transmitter.

5. In an apparatus for receiving intelligence conveyed by sound waves, a resonating tube, a transmitter contained therein in combination with responsive means in operative relation thereto.

6. A resonating tube submerged in water and adapted to receive sound-vibrations imparted to the water and transferred by it, an electric transmitter contained in said tube and a responsive means in electric circuit with said transmitter.

ARTHUR J. MUNDY.

Witnesses:
F. F. RAYMOND, 2d,
J. M. DOLAN.